(12) United States Patent
Haseba et al.

(10) Patent No.: US 9,927,160 B2
(45) Date of Patent: Mar. 27, 2018

(54) EVAPORATOR

(71) Applicant: DENSO CORPORATION, Kariya, Aichi-pref. (JP)

(72) Inventors: Daisuke Haseba, Toyota (JP); Toshiya Nagasawa, Obu (JP); Eiichi Torigoe, Anjo (JP); Jun Abei, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 465 days.

(21) Appl. No.: 14/416,235

(22) PCT Filed: Jul. 22, 2013

(86) PCT No.: PCT/JP2013/004431
§ 371 (c)(1),
(2) Date: Jan. 21, 2015

(87) PCT Pub. No.: WO2014/017060
PCT Pub. Date: Jan. 30, 2014

(65) Prior Publication Data
US 2015/0184909 A1    Jul. 2, 2015

(30) Foreign Application Priority Data
Jul. 23, 2012  (JP) .................................. 2012-162898

(51) Int. Cl.
*F25B 43/00* (2006.01)
*F25B 39/02* (2006.01)
(Continued)

(52) U.S. Cl.
CPC .............. *F25B 43/00* (2013.01); *F25B 39/02* (2013.01); *F25B 39/022* (2013.01);
(Continued)

(58) Field of Classification Search
CPC .. F28F 17/005; F25B 2700/2117; F25D 21/00
(Continued)

(56) References Cited

U.S. PATENT DOCUMENTS

| | | | |
|---|---|---|---|
| 5,251,454 A * | 10/1993 | Yoon ..................... | F25D 21/006 62/140 |
| 2004/0134207 A1* | 7/2004 | Morita ............... | B60H 1/00792 62/158 |

(Continued)

FOREIGN PATENT DOCUMENTS

| | | |
|---|---|---|
| JP | H085110 A | 1/1996 |
| JP | 10-291414 | 11/1998 |

(Continued)

OTHER PUBLICATIONS

Office Action dated Nov. 13, 2015 in corresponding Korean Application No. 10-2015-7002331 with English translation.
(Continued)

*Primary Examiner* — Keith Raymond
*Assistant Examiner* — Amanda P Setiawan
(74) *Attorney, Agent, or Firm* — Harness, Dickey & Pierce, P.L.C.

(57) ABSTRACT

An evaporator includes multiple refrigerant tubes, multiple air passages provided between the refrigerant tubes, a cold storage container disposed in the multiple air passages, and a temperature detector. The evaporator further includes a freezing allowable region and a freezing unallowable region that is provided above the freezing allowable region. The cold storage container has a small thickness region and a large thickness region that is positioned above the small thickness region. The large thickness region demarcates a smaller space with the refrigerant tubes than the space demarcated between the small thickness region and the refrigerant tubes. The small thickness region of the cold storage container is positioned within the freezing allowable region, the large thickness region is positioned in the freez-
(Continued)

ing unallowable region, and the temperature detector is disposed in the freezing allowable region.

11 Claims, 7 Drawing Sheets

(51) Int. Cl.
    *F28D 1/053*     (2006.01)
    *F28D 20/02*     (2006.01)
    *F28F 3/02*     (2006.01)
    *F28F 3/04*     (2006.01)
    *F28F 17/00*     (2006.01)
    *F28D 1/04*     (2006.01)
    *F28D 21/00*     (2006.01)
    *F28D 20/00*     (2006.01)

(52) U.S. Cl.
    CPC ..... *F28D 1/05366* (2013.01); *F28D 1/05391* (2013.01); *F28D 20/02* (2013.01); *F28F 3/027* (2013.01); *F28F 3/046* (2013.01); *F28F 17/005* (2013.01); *F25B 2400/24* (2013.01); *F25B 2700/2117* (2013.01); *F28D 1/0435* (2013.01); *F28D 2020/0008* (2013.01); *F28D 2020/0013* (2013.01); *F28D 2021/0085* (2013.01); *F28F 2265/14* (2013.01); *Y02E 60/145* (2013.01)

(58) Field of Classification Search
    USPC .......................................................... 165/10
    See application file for complete search history.

(56) References Cited

U.S. PATENT DOCUMENTS

| | | | |
|---|---|---|---|
| 2008/0035318 A1* | 2/2008 | Kamada | F24F 1/18 165/133 |
| 2010/0024452 A1* | 2/2010 | Lifson | F25D 21/06 62/154 |
| 2010/0065244 A1* | 3/2010 | Yokoyama | F28D 1/05383 165/10 |
| 2010/0307180 A1* | 12/2010 | Yamada | F25D 19/00 62/285 |
| 2012/0037342 A1* | 2/2012 | Holloway | F24F 5/0021 165/104.13 |
| 2012/0042687 A1 | 2/2012 | Kamoshida et al. | |
| 2012/0285668 A1 | 11/2012 | Abei et al. | |

FOREIGN PATENT DOCUMENTS

| | | |
|---|---|---|
| JP | 2011012947 A | 1/2011 |
| JP | 2011133178 A | 7/2011 |
| JP | 2012-137199 | 7/2012 |
| JP | 2012237474 A | 12/2012 |

OTHER PUBLICATIONS

International Search Report and Written Opinion (in Japanese with English Translation) for PCT/JP2013/004431, dated Aug. 27, 2013; ISA/JP.

* cited by examiner

EVAPORATOR

CROSS REFERENCE TO RELATED APPLICATIONS

This application is a U.S. National Phase Application under 35 U.S.C. 371 of International Application No. PCT/JP2013/004431 filed on Jul. 22, 2013 and published in Japanese as WO 2014/017060 A1 on Jan. 30, 2014. This application is based on and claims the benefit of priority from Japanese Patent Application No. 2012-162898 filed on Jul. 23, 2012. The entire disclosures of all of the above applications are incorporated herein by reference.

TECHNICAL FIELD

The present disclosure relates to an evaporator of a refrigeration cycle device.

BACKGROUND ART

In a vehicle air conditioner for a so-called idle-stop vehicle, an evaporator having a cold storage function is often used for keeping cool feelings of a passenger at the time of temporary stop of the vehicle. Known as such evaporator having the cold storage function is one described in Patent Document 1, for example. The evaporator of Patent Document 1 is a type in which cold storage containers containing a cold storage material are disposed between multiple refrigerant tubes. Since the arrangement of the cold storage containers may cause retention and freezing of condensed water and deformation or damage of elements of the evaporator caused thereby, the cold storage container of the Patent Document 1 has multiple grooves or recess portions distributed with uniformity on its entire surface for promoting of flowing down of the condensed water due to gravity.

PRIOR ART DOCUMENT

Patent Document

Patent Document 1: JP 2011-12947 A

SUMMARY OF THE INVENTION

The flowing down of the condensed water is promoted by the multiple grooves and recess portions provided in the cold storage containers described in Patent Document 1. However, especially when a distance between refrigerant tubes is narrow, retention of the condensed water may occur, and consequently, deformation or breakage may occur due to freezing of the condensed water.

In consideration of the above-described points, it is an object of the present disclosure is to provide an evaporator capable of preventing its breakage or the like caused by freezing of condensed water.

According to an aspect of the present disclosure, an evaporator includes refrigerant tubes each of which extends in a vertical direction and has a refrigerant passage, the tubes being disposed parallel to each other; air passages provided between the refrigerant tubes; at least one cold storage container disposed in a subset of the air passages and containing a cold storage material; and a temperature detector that detects a temperature. The evaporator further includes a freezing allowable region in which freezing of generating condensed water is allowed, and a freezing unallowable region in which the freezing of generating condensed water is not allowed, the freezing unallowable region being provided on an upper side of the freezing allowable region. The cold storage container includes a first region that defines a relatively large space with the refrigerant tubes for promoting of drainage of the condensed water, and a second region that is positioned on an upper side of the first region and defines a smaller space with the refrigerant tubes than the space defined by the first region. The first region of the cold storage container is positioned within the freezing allowable region, and the second region of the cold storage container is positioned within the freezing unallowable region. The temperature detector is disposed in the freezing allowable region.

Accordingly, even when the freezing of the condensed water occurs within the freezing allowable region, deformation or breakage of the cold storage container or the like is not caused. In order to prevent the freezing of the condensed water within the freezing unallowable region, an ON-OFF control of a compressor can be performed in accordance with the temperature detected by the detector. It is known that a temperature distribution is generated, in which the temperature becomes lower downward of the refrigerant tubes after stopping of the compressor. Hence, the temperature detected by the temperature detector disposed within the freezing allowable region is used as a represent temperature of a heat exchange surface. Accordingly, a temperature of the ON-OFF control of the compressor can be set to prevent the freezing of the condensed water within the freezing unallowable region that is present on the upper side of the temperature detector. Therefore, it becomes possible, accordingly, to provide the evaporator capable of preventing its breakage or the like caused by the freezing of the condensed water.

EMBODIMENTS FOR EXPLOITATION OF THE INVENTION

Figure 1:
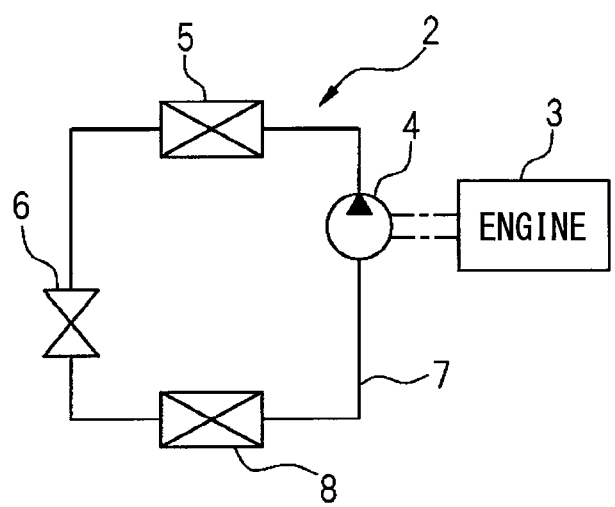
FIG. 1 is a schematic diagram showing a refrigeration cycle device including an evaporator according to an embodiment of the present disclosure.

Hereinafter, an evaporator 8 according to an embodiment of the present disclosure will be described below referring to FIGS. 1 to 6. The evaporator 8 functions as a component of a refrigeration cycle device 2 constituting a vehicle air conditioner mounted on a so-called idle-stop vehicle in the present embodiment, and has a cold storage function.

According to the evaporator 8, when a compressor 4 is stopped due to idling stop of the vehicle, a low temperature cold storage material absorbs heat from a relatively high temperature ambient air, and a temperature increase speed of the ambient air is reduced. Thus, a duration time of cool feelings of a passenger in the vehicle can be prolonged.

The refrigeration cycle device 2 includes the compressor 4, a condenser 5, an expansion valve 6, a liquid receiver (not shown), the evaporator 8 and a pipe passage 7 connecting these and let a refrigerant circulate therein. The refrigeration cycle device 2 performs a refrigeration cycle operation in which the refrigerant absorbs heat from the ambient air in the evaporator 8 and radiates the heat in the condenser 5.

The compressor 4 is driven by a power of an engine 3 of the vehicle via a non-shown belt and an electromagnetic clutch.

Figure 2:
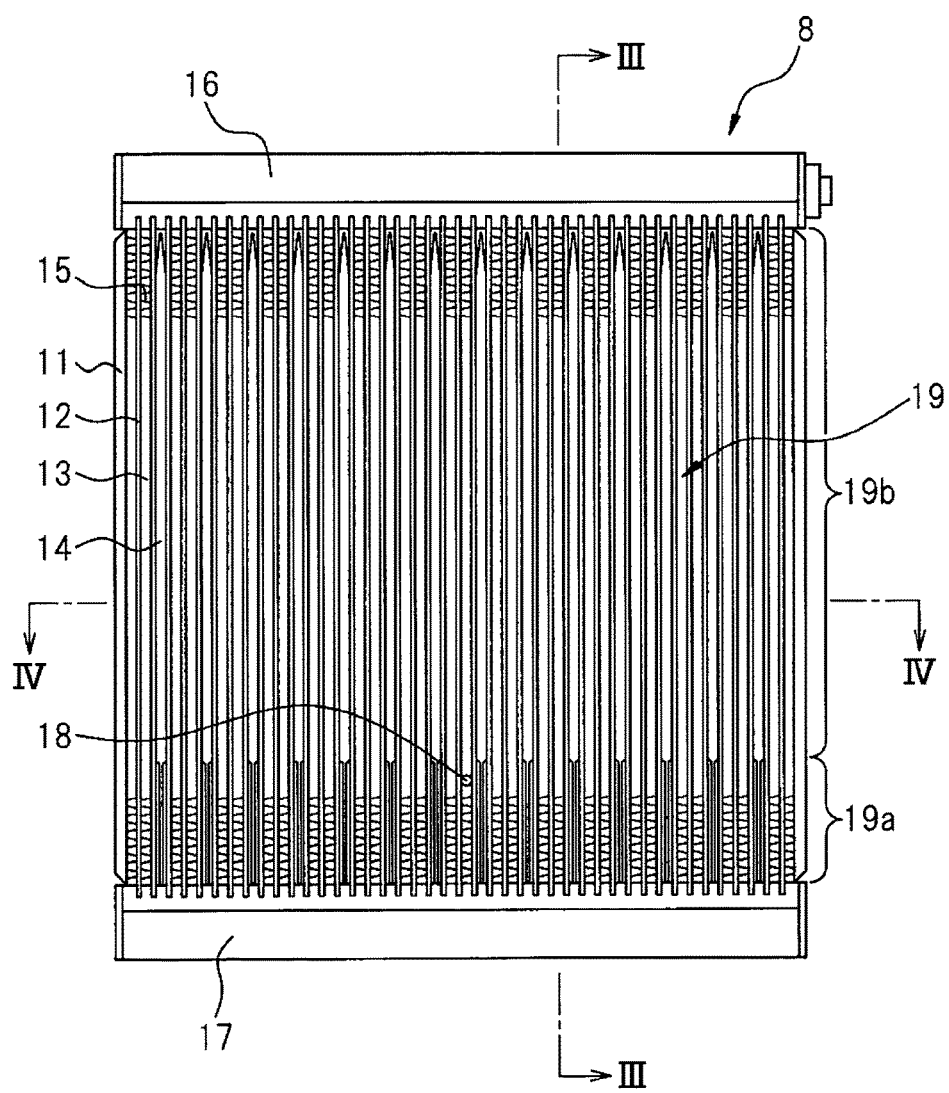
FIG. 2 is a front view showing the evaporator according the embodiment.

The evaporator 8 includes frame members 11 extending vertically on right and left outer sides in FIG. 2, multiple refrigerant tubes 12 extending in a vertical direction parallel to each other and at regular intervals, air passages 13 that are multiple clearances between the refrigerant tubes 12, cold storage containers 14 disposed in a group of air passages 13 of the multiple air passages 13, fins 15 disposed for heat exchange in multiple air passages 13 in which the cold storage containers 14 are not provided, an upper header 16 extending horizontally and connected to upper end parts of the multiple refrigerant tubes 12, a lower header 17 extending horizontally and connected to lower end parts of the multiple refrigerant tubes 12, and a temperature detector 18 fixed to one of the fins 15 to detect a temperature of a surface of heat exchange with air. Additionally, a heat exchange portion 19, which performs heat exchange between the refrigerant and the air, between the refrigerant and a cold storage material, or between the cold storage material and the air, is formed by the refrigerant tubes 12, the air passages 13, the cold storage containers 14 and the fins 15.

The heat exchange portion 19 includes a freezing allowable region 19a that is a region configured such that deformation or breakage of the cold storage containers 14 and the refrigerant tubes 12 is not caused even when condensed water generating there is frozen, and a freezing unallowable region 19b that is not configured such manner. These regions are two separated regions upper and lower. The freezing allowable region 19a is provided on a lower side, and the freezing unallowable region 19b is provided on an upper side of the freezing allowable region 19a.

Figure 3:
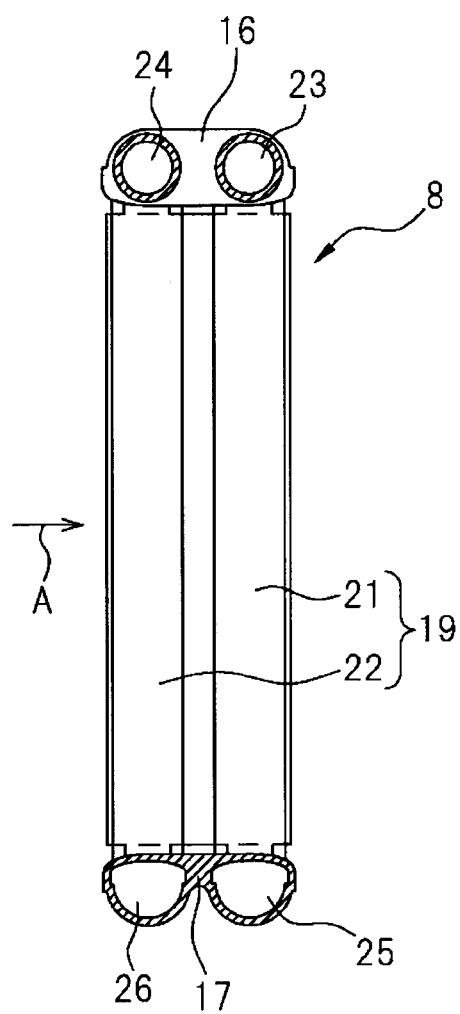
FIG. 3 is a schematic sectional diagram taken along a line III-III of FIG. 2.

The heat exchange portion 19 is, as shown in FIG. 3, configured by a first heat exchange portion 21 and a second heat exchange portion 22 that are disposed into two layers. The second heat exchange portion 22 is disposed upstream, and the first heat exchange portion 21 is disposed downstream, with respect to an air flow direction shown by an arrow A of FIG. 3. Both the first heat exchange portion 21 and the second heat exchange portion 22 include the freezing allowable region 19a and the freezing unallowable region 19b.

The upper header 16 includes a first header flow passage 23 and a third header flow passage 24 that are formed therein, and the lower header 17 includes a second header flow passage 25 and a fourth header flow passage 26 that are formed therein.

The first heat exchange portion 21 includes multiple, forty three refrigerant tubes 12 in the present embodiment, and upper end parts and lower end parts of each refrigerant tube 12 are connected to the first header flow passage 23 and the second header flow passage 25, respectively. Similarly, the second heat exchange portion 22 includes forty three refrigerant tubes 12, and upper end parts and lower end parts of each refrigerant tube 12 are connected to the third header flow passage 24 and the fourth header flow passage 26.

In an end part of the first header flow passage 23, a non-shown joint is provided as a refrigerant inlet. An inside of the first header flow passage 23 is partitioned into a first compartment and a second compartment by a non-shown partition plate provided at an approximately center in a longitudinal direction of the first header flow passage 23. In accordance with this, the multiple refrigerant tubes 12 are divided into a first group and a second group.

The refrigerant is supplied to the first compartment of the first header flow passage 23 through the refrigerant inlet, and subsequently, the refrigerant is distributed to multiple refrigerant tubes 12 of the first group and flows into and is gathered in the second header flow passage 25. Then, the refrigerant is further distributed from the second header flow passage 25 to multiple refrigerant tubes 12 of the second group and flows into the second compartment of the first header flow passage 23. Accordingly, the first heat exchange portion 21 has a flow passage in which the refrigerant flows along a U-shape.

In an end part of the third header flow passage 24, a non-shown joint is provided as a refrigerant outlet. An inside of the third header flow passage 24 is partitioned into a first compartment and a second compartment by a non-shown partition plate provided at an approximately center in a longitudinal direction of the third header flow passage 24.

In accordance with this, the multiple refrigerant tubes 12 are divided into a first group and a second group. The first compartment of the third header flow passage 24 is positioned adjacent to the second compartment of the first header flow passage 23. The first compartment of the third header flow passage 24 communicates with the second compartment of the first header flow passage 23.

The refrigerant flows from the second compartment of the first header flow passage 23 into the first compartment of the third header flow passage 24 and is distributed to multiple refrigerant tubes 12 of the first group. The refrigerant flows into and is gathered in the fourth header flow passage 26 through the first group, and subsequently, the refrigerant is further distributed to multiple refrigerant tubes 12 of the second group. The refrigerant flows into the second compartment of the third header flow passage 24 through the second group. Accordingly, the second heat exchange portion 22 also has a flow passage in which the refrigerant flows along a U-shape. The refrigerant in the second compartment of the third header flow passage 24 flows out to the compressor 4 through the refrigerant outlet.

As shown in FIG. 2, multiple clearances between the multiple refrigerant tubes 12 arranged at regular intervals and extending in the vertical direction function as the air passages 13 through which air blown for heat exchange by a non-shown blower passes. The cold storage containers 14 are disposed in a subset of air passages 13 among the multiple air passages 13 with predetermined regularity, and the fins 15 are disposed in another subset of air passages 13 among the multiple air passages 13 with predetermined regularity. The cold storage containers 14 are disposed dispersedly and equally in an entire of the heat exchange portion 19. The fins 15 and the cold storage containers 14 are separately brazed to the refrigerant tubes 12.

Each of the refrigerant tubes 12 of the present embodiment is an extrusion molded product made of aluminum alloy, and has multiple refrigerant passages therein. A cross-sectional shape of the refrigerant tube 12 is flattened and the refrigerant tube 12 has two flat main side surfaces that are opposed to each other parallel. The two main side surfaces of the refrigerant tube 12 are bonded to the fins 15, or one of the two main side surfaces is, as shown in FIG. 4, bonded to the fin 15, and the other of the two main side surfaces is bonded to the cold storage container 14.

The fins 15 in the present embodiment are so-called corrugated fins, and are made of thin aluminum plates. In a front view of FIG. 2, multiple approximately U-shaped portions are alternated continuously to extend in the vertical direction of the drawing. A straight portion of the approximately U-shaped fins 15 has, as shown in FIG. 4, multiple louver parts 28 in order to improve a heat-transfer coefficient by changing a flow of the refrigerant flowing on a surface of the straight portion.

A dimension in the vertical direction, i.e. a height of each fin 15 is approximately equal to a height of the air passage 13 between the refrigerant tubes 12. Further, in the present embodiment, the fin 15 is used in common between the first heat exchange portion 21 and the second heat exchange portion 22. Hence, a dimension of the fin 15 in the air flow direction is configured to include dimensions of two refrigerant tubes that are a refrigerant tube 12 of the first heat exchange portion 21 and a refrigerant tube 12 of the second heat exchange portion 22. The same goes for the cold storage containers 14. However, an embodiment may be possible, in which the fins 15 and/or the cold storage containers 14 are not used in common between the first heat exchange portion 21 and the second heat exchange portion 22.

Figure 4:
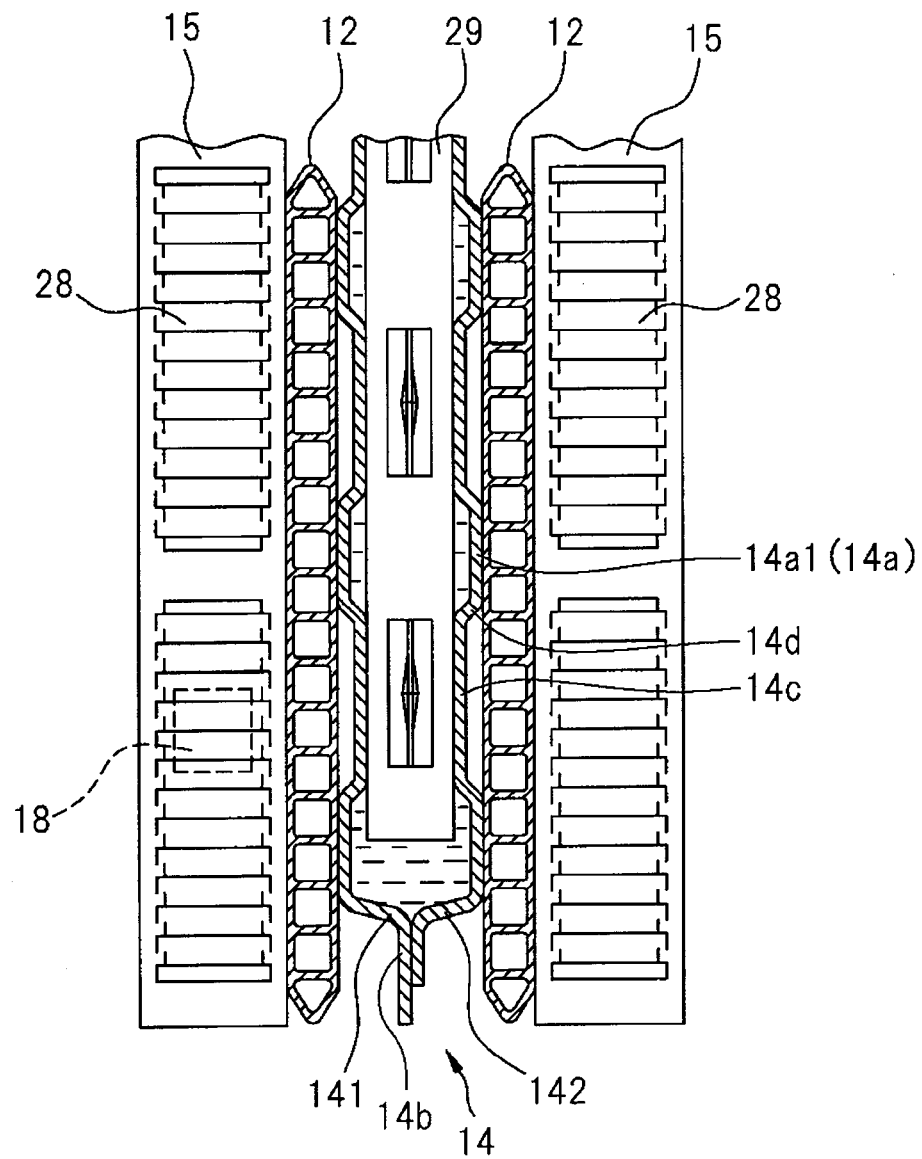
FIG. 4 is a partial sectional diagram taken along a line IV-IV of FIG. 2.

As shown in FIG. 4, each cold storage container 14 of the present embodiment is formed by coupling two sheets of plate-like members 141 and 142 on their sides, which are made of aluminum alloy and have approximately the same shape. The cold storage material containing paraffin is sealed inside the cold storage container 14. The cold storage container 14 is disposed in the air passage 13 between the refrigerant tubes 12 and can be fixed to the refrigerant tubes 12. The cold storage container 14 has largest thickness portions 14a that are largest in thickness (width) in a horizontal direction, and dimensions of the largest thickness portions 14a are approximately the same as a width of the air passage 13 in the horizontal direction of FIG. 2, i.e. a distance between adjacent refrigerant tubes 12. Each largest thickness portion 14a is fixed to the refrigerant tubes 12. A height dimension of the cold storage container 14 is also approximately the same as the height of the air passage 13. In other words, the cold storage container 14 has a flattened and approximately rectangular parallelepiped shape.

Figure 5:
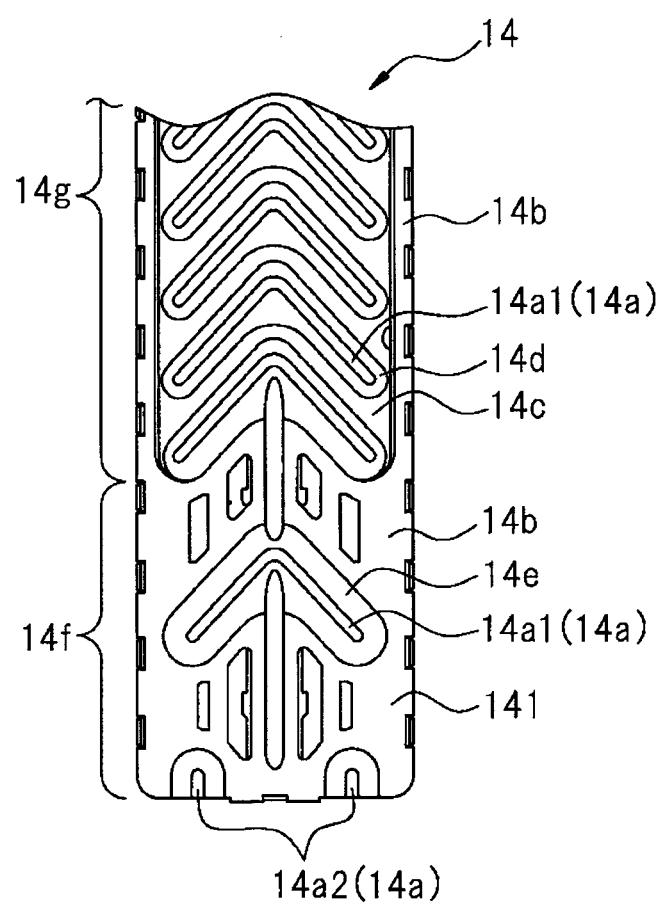
FIG. 5 is a partial side view showing a cold storage container of the evaporator according to the embodiment.

The two sheets of plate-like members 141 and 142 have protrusions and recesses similarly to each other. Thus, each cold storage container 14 has protrusions and recesses that are symmetric with respect to its vertical axial line. As shown in FIG. 5, the cold storage container 14 includes the multiple largest thickness portions 14a, a smallest thickness portion 14b having a thickness approximately the same as a total thickness of the two sheets of plate-like members with holding the cold storage material little, a middle thickness portion 14c having a middle thickness between that of the largest thickness portion 14a and the smallest thickness portion 14b in the horizontal direction, a first connection portion 14d positioned between the largest thickness portion 14a and the middle thickness portion 14c and connecting the largest thickness portion 14a and the middle thickness portion 14c, and a second connection portion 14e positioned between the largest thickness portion 14a and the smallest thickness portion 14b and connecting the largest thickness portion 14a and the smallest thickness portion 14b. The multiple largest thickness portions 14a, as shown in FIG. 5, include first largest thickness parts 14a1 having V-shapes (chevron curves), and second largest thickness parts 14a2 that are thin and elongated and extend in the vertical direction. Air is capable of flowing through spaces between and the refrigerant tube 12 and the smallest thickness portion 14b or the middle thickness portion 14c other than the largest thickness parts in a state where the cold storage container 14 is disposed in the air passage 13.

The smallest thickness portion 14b of the cold storage container 14 of the present embodiment, as shown in FIG. 5, covers a relatively wide area within a small thickness region 14f (first region) that is a relatively lower region in the cold storage container 14. The smallest thickness portion 14b has a thin rectangular shape along an edge part of the cold storage container 14 and covers a relatively small area in a large thickness region 14g (second region) that is a region other than the small thickness region 14f. The large thickness region 14g is an upper region in the cold storage container 14, and is small in area ratio covered by the smallest thickness portion 14b. An area ratio of the portions (14b, 14c) other than the largest thickness parts to the largest thickness portions 14a in the small thickness region 14f is higher than an area ratio of the portions (14b, 14c) other than the largest thickness parts to the largest thickness portions 14a in the large thickness region 14g. The large thickness region 14g and the refrigerant tube 12 define therebetween a space smaller than a space defined between the small thickness region 14f and the refrigerant tube 12. Most of the small thickness region 14f is covered by the smallest thickness portion 14b, but one first largest thickness part 14a1 and two second largest thickness parts 14a2 are located within the small thickness region 14f. These largest thickness portions 14a in the small thickness region 14f are provided mainly for the purpose of securement of joint strength of the cold storage container 14 to the refrigerant tube 12.

While the smallest thickness portion 14b is limited to a small area region having a thin rectangular shape along the edge part of the container in the large thickness region 14g, most area of the large thickness region 14g is covered by the middle thickness portion 14c and the first largest thickness parts 14a1 which are thicker than the smallest thickness portions 14b. The middle thickness portion 14c has an approximately rectangular shape and extends from an upper end of the small thickness region 14f to near an upper end part of the cold storage container 14. The middle thickness portion 14c accommodates the cold storage material and an inner fin 29 therein. The multiple V-shaped first largest thickness parts 14a1 are arranged at regular intervals in the vertical direction within a region of the large thickness region 14g where the middle thickness portion 14c is provided. The first largest thickness parts 14a1 also accommodate the cold storage material therein. In other words, the multiple first largest thickness parts 14a1 are provided in the large thickness region 14g. The large thickness region 14g is positioned adjacent to an upper side of the small thickness region 14f. The large thickness region 14g is larger than the small thickness region 14f in cross sectional area of the cold storage container 14.

The inner fin 29 inside the cold storage container 14 is an aluminum corrugated fin provided for enhancement of heat transfer performance between the refrigerant tube 12 and the cold storage material. The inner fin 29 is bonded to inner walls of the plate-like members 141 and 142 of the cold storage container 14 by brazing.

The large thickness region 14g of the cold storage container 14 is formed to be wider than the small thickness region 14f. In the present embodiment, a ratio of the large thickness region 14g to a whole length of the cold storage container 14, i.e. an overall height is set approximately 80%, and the ratio of the small thickness region 14f is set approximately 20%.

Figure 6:
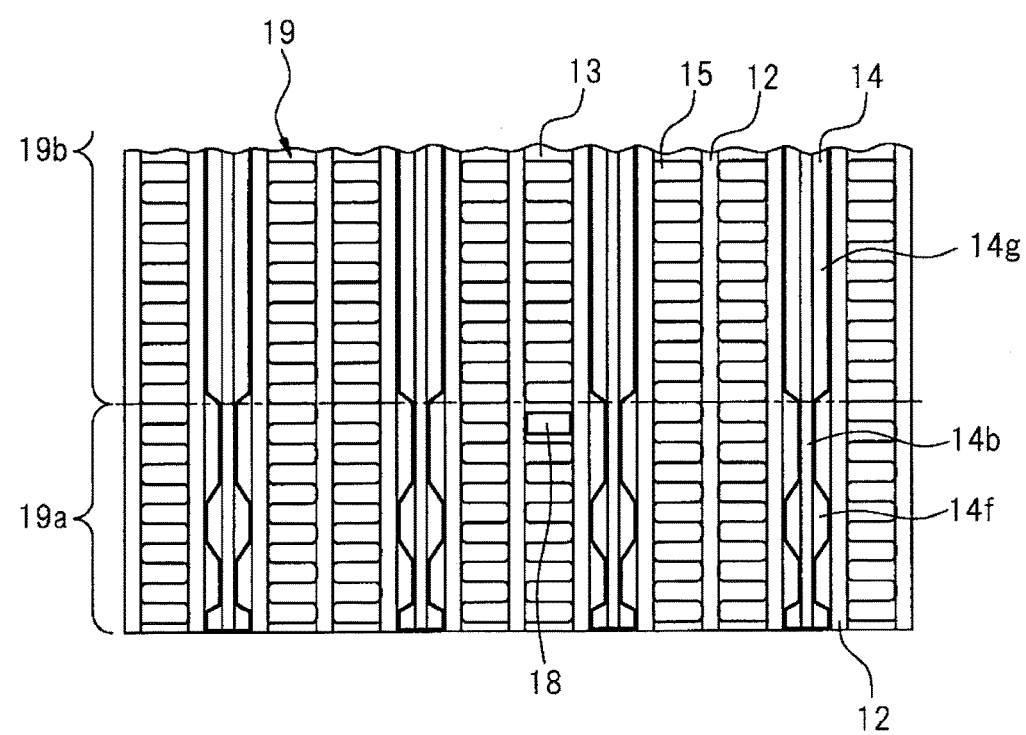
FIG. 6 is a schematic partial front view showing a region including a freezing allowable region of a heat exchange portion of the evaporator according to the embodiment.

FIG. 6 is a schematic partial front view of a region including the freezing allowable region 19a of the heat exchange portion 19, and shows that spaces are provided between the smallest thickness portions 14b of the small thickness regions 14f and the refrigerant tubes 12 according to the above-described shapes of the cold storage containers 14. Additionally, relatively small spaces in width are provided between the middle thickness portions 14c of the large thickness regions 14g and the refrigerant tubes 12, though these spaces are not shown in FIG. 6.

Condensed water generates on a surface of the evaporator 8. When the generated condensed water is accumulated and frozen in the space provided between the cold storage container 14 and the refrigerant tube 12, the condensed water may expand in volume and cause deformation or breakage of the cold storage container 14 and the refrigerant tube 12. The small thickness region 14f of the cold storage container 14 is provided for promoting of discharge of the condensed water from the space such that a width of the space in the horizontal direction in FIG. 6 becomes wide. Thus, in the present embodiment, even when a small amount of condensed water remains and freezes in the space between the small thickness region 14f and the refrigerant tube 12, the frozen condensed water does not cause deformation or breakage of the cold storage container 14 and the refrigerant tube 12 because the width of the space is wide.

On the other hand, in the large thickness region 14g, since the first largest thickness parts 14a1 are formed into the V-shape, drainage performance of the condensed water is improved. However, in the present embodiment, the space provided between the middle thickness portion 14c and the refrigerant tube 12 is small in width in the horizontal direction, and thus, most of the space is filled with the generated condensed water. When the condensed water filling the space freezes, the condensed water may cause deformation or breakage of the cold storage container 14 and the refrigerant tube 12 depending on strengths thereof. The main reason why the middle thickness portion 14c is provided in the large thickness region 14g is to reduce a defect generation rate of brazing by decreasing a brazing area.

A boundary between the small thickness region 14f and the large thickness region 14g of the cold storage container 14 is coincident with a boundary between the freezing allowable region 19a and the freezing unallowable region 19b of the heat exchange portion 19. Hence, the small thickness region 14f is positioned within the freezing allowable region 19a, and the large thickness region 14g is positioned within the freezing unallowable region 19b. The small thickness region 14f may be coincident with the freezing allowable region 19a, and the large thickness region 14g may be coincident with the freezing unallowable region 19b.

The temperature detector 18 is configured by a thermistor 18 in the present embodiment, and a lead wire (not shown) extending from the thermistor 18 is connected to a controller (not shown) of the vehicle air conditioner. The thermistor 18 is fixed by a non-shown clip-like fixing member to a part that is a downstream side of the fin 15 in an air flow so as to detect a temperature of a surface of the fin 15 which is a heat exchange surface with the air. The thermistor 18 is fixed to the fin 15 located at an approximately center in the horizontal direction of FIG. 2 within the freezing allowable region 19a. More specifically, the thermistor 18 is fixed to the fin 15 positioned slightly lower than the upper end of the freezing allowable region 19a and within the freezing allowable region 19a.

Actions and effects of the evaporator 8 of the present embodiment will be described.

When the refrigeration cycle device 2 is operated, the compressor 4 is operated, and the refrigerant begins to circulate in the device. A low temperature refrigerant passing through the refrigerant tubes 12 of the evaporator 8 absorbs heat from a relatively high temperature ambient air passing through the air passages 13 and the cold storage material in the cold storage containers 14, and accordingly reduces temperatures thereof. In this case, the refrigeration cycle device 2 controls the compressor 4 into ON or OFF based on the temperature of the fin 15 which is detected by the thermistor 18 such that the temperatures of surfaces of the refrigerant tubes 12 and the fins 15 does not becomes less than or equal to 0° C. in order to avoid freezing of the generated condensed water. In the present embodiment, a region is produced, in which the temperatures of the surfaces of the refrigerant tubes 12 and the fins 15 become lower than or equal to 0° C. This will be described in detail below.

Immediately after the compressor 4 is stopped, all refrigerant in the refrigerant tubes 12 flows down into the second header flow passage 25 and the fourth header flow passage 26 of the lower header 17. In this case, a lower part of the refrigerant tubes 12, which contacts the flowing refrigerant for a longer time, decreases in temperature more than an upper part of the refrigerant tubes 12. Thus, immediately after the stop of the compressor 4, a temperature of the fin 15 located lower than the position of the thermistor 18 becomes lower than the detection temperature of the thermistor 18, and a temperature of the fin 15 located upper than the position of the thermistor 18 becomes higher than the detection temperature of the thermistor 18.

In the present embodiment, a temperature at which the compressor 4 is turned ON or OFF in the ON/OFF control is set at a temperature (e.g., ON temperature: 2° C., and OFF temperature: 1° C.) slightly higher than 0° C. Thus, the compressor 4 is sometimes operated before the temperature of the fin 15 located lower than the position of the thermistor 18 increases sufficiently after the stop of the compressor 4. As a result, the condensed water contacting the fin 15 and the refrigerant tube 12 that are located lower than the position of the thermistor 18 may be frozen. On the other hand, the temperature of the fin 15 located upper than the position of the thermistor 18 is kept at a temperature higher than at least 0° C., and thus the freezing of the condensed water does not occur.

The thermistor 18 is disposed within the freezing allowable region 19a. Since the freezing allowable region 19a is provided lower than the position of the thermistor 18, deformation or breakage of the refrigerant tubes 12 and the cold storage containers 14 is avoided even when the accumulated condensed water freezes. Since the freezing allowable region 19a is covered by the small thickness region 14f of the cold storage container 14, an amount of the condensed water accumulated in the air passages 13 in which the cold storage containers 14 are disposed is small. Hence, even when the small amount of the condensed water freezes, the refrigerant tubes 12 or the cold storage containers 14 is not damaged. On the other hand, even when the condensed water accumulated in the air passages 13 in which the fins 15 are disposed freezes, the condensed water is capable of expanding in volume freely without limitation in the air flow direction. Hence, a power for damaging the refrigerant tubes 12 or the fins 15 is not produced, and there is thus no problem.

Since the setting temperature of the ON-OFF control of the compressor is higher than 0° C. as described above, the condensed water generated on an upper side of the thermistor 18 does not freeze. Thus, the condensed water within the freezing unallowable region 19b that is certainly located on an upper side of the thermistor 18 disposed within the freezing allowable region 19a does not freeze. Therefore, the condensed water in a space between the large thickness region 14g of the cold storage container 14 and the refrigerant tube 12 also does not freeze, and a power for damaging the refrigerant tube 12 and the cold storage container 14 is not generated.

According to the present embodiment, even when the compressor 4 is controlled to be ON or OFF at the temperature slightly higher than 0° C., deformation or breakage of a component of the evaporator 8 caused by the freezing of the condensed water can be prevented.

Figure 7:
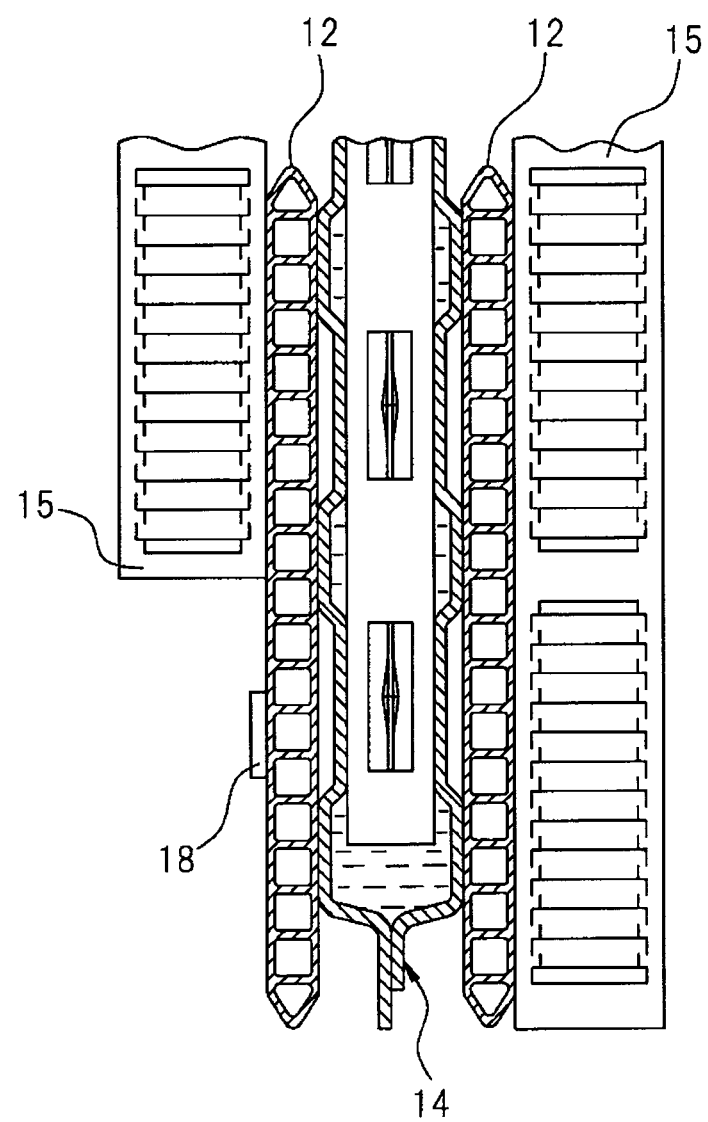
FIG. 7 is a partial sectional diagram showing an evaporator according to a modification of the present disclosure.

In the above-described embodiment, the thermistor 18 detects the temperature of the fin 15 as a temperature of the heat exchange surface with the air, but the thermistor 18 may detects a surface temperature of the refrigerant tube 12 as the temperature of the heat exchange surface with the air. Actually, the surface temperature of the refrigerant tube 12 is slightly lower than a surface temperature of the fin 15, but this temperature difference is an ignorable level or a processable level by fine regulating of the setting temperature of the ON-OFF control. When the thermistor 18 is fixed to the refrigerant tube, the thermistor is attached to the main side surface of the refrigerant tube 12 by a non-shown fixation tool, as shown in FIG. 7 that is a partial flat sectional view similar to FIG. 4. A part of the fin 15 which contacts the thermistor and the fixation tool (not shown) is cut and omitted.

The thermistor 18 may detect a surface temperature of the cold storage container 14. In this case, the thermistor 18 is attached to a surface of the small thickness region 14f disposed within the freezing allowable region 19a of the cold storage container 14.

Further, the thermistor 18 may detect a temperature of the air instead of the heat exchange surface with the air. In this case, the thermistor 18 is disposed to detect an air temperature of the air passage 13 within the freezing allowable region 19a, or an air temperature on an immediately downstream side of the air passage 13 within the freezing allowable region 19a.

In the above-described embodiment, the fin 15 extends over the whole length of the air passage 13 in which the fin 15 is disposed, but the fin 15 may extend partially in the air passage 13. For example, the fin 15 may extend only within the freezing unallowable region 19b, and the fin 15 may not be provided within the freezing allowable region 19a. In this case, the thermistor 18 detects the surface temperature of the refrigerant tube 12. Accordingly, accumulation of the condensed water in the air passage 13 within the freezing allowable region 19a can be reduced largely.

At least one part of the air passage 13 of the multiple air passages 13 may be an air passage 13 in which neither fin 15 nor cold storage container 14 is provided.

In the above-described embodiment, the large thickness region 14g of the cold storage container 14 includes not only the first largest thickness part 14a1 but also the smallest thickness portion 14b and the middle thickness portion 14c. However, the large thickness region 14g of the cold storage container 14 may be configured only by the largest thickness portion.

In the above-described embodiment, the small thickness region 14f of the cold storage container 14 includes not only the smallest thickness portion 14b but also the second largest thickness part 14a2 and the middle thickness portion 14c. However, the small thickness region 14f of the cold storage container 14 may configured only by the smallest thickness portion 14b.

In the above-described embodiment, a configuration applied to the refrigeration cycle device 2 of the vehicle using the internal combustion engine as a vehicle-running drive source is described. However, the configuration may be applied to a refrigeration cycle device of a vehicle using a motor as the vehicle-running drive source.

In the above-described embodiment, the evaporator 8 is used for the refrigeration cycle device 2 for the idle-stop vehicle. However, the evaporator 8 according to the present disclosure may be used for not only the refrigeration cycle device 2 for the idle-stop vehicle but also various refrigeration cycle devices.

What is claimed is:

1. An evaporator comprising:
   a plurality of refrigerant tubes each of which extends in a vertical direction and has a refrigerant passage, the tubes being disposed parallel to each other;
   a plurality of air passages provided between the refrigerant tubes;
   at least one cold storage container disposed in a subset of air passages of the plurality of air passages and containing a cold storage material;
   a fin disposed in another subset of air passages of the plurality of air passages;
   a temperature detector that detects a temperature; and
   a freezing allowable region in which freezing of condensed water is allowed, and a freezing unallowable region in which the freezing of condensed water is prevented by an ON-OFF control of a compressor based on the temperature detected by the temperature detector, the freezing unallowable region being provided on an upper side of the freezing allowable region, wherein
   the cold storage container includes a first region that defines a space with the refrigerant tubes for promoting of drainage of the condensed water, and a second region that is positioned on an upper side of the first region and defines a smaller space with the refrigerant tubes than the space defined by the first region,
   the first region of the cold storage container is positioned within the freezing allowable region,
   the second region of the cold storage container is positioned within the freezing unallowable region, and
   the temperature detector is disposed in the freezing allowable region.

2. The evaporator according to claim 1, wherein
   the cold storage container includes a largest thickness portion having a thickness equal to a distance between the refrigerant tubes and fixed to the refrigerant tubes, and another portion that defines a space together with the refrigerant tubes, the air flowing through the space defined between the other portion and the refrigeration tubes, and
   a ratio of the other portion to the largest thickness portion in the first region is higher than a ratio of the other portion to the largest thickness portion in the second region.

3. The evaporator according to claim 1, further comprising a heat exchange fin disposed in another part of the air passages, wherein
the temperature detector detects a temperature of the heat exchange fin.

4. The evaporator according to claim 1, wherein the temperature detector detects a temperature of a surface of the refrigerant tubes.

5. The evaporator according to claim 1, wherein the temperature detector detects a temperature of a surface of the cold storage container.

6. The evaporator according to claim 1, wherein the temperature detector detects a temperature of air in the air passages.

7. The evaporator according to claim 1, wherein the temperature detector detects a temperature of air immediately downstream of an outlet of the air passages.

8. An evaporator comprising:
a plurality of refrigerant tubes having refrigerant passages and disposed parallel to each other to extend in a vertical direction;
a plurality of air passages provided between the refrigerant tubes;
at least one cold storage container disposed between the refrigerant tubes and accommodating a cold storage material therein; and
a temperature detector that detects an air temperature downstream of the air passages or a temperature corresponding to a temperature of a refrigerant passing through insides of the refrigerant tubes, wherein
the cold storage container includes:
a largest thickness portion contacting the refrigerant tubes and having a thickness equal to a distance between the refrigerant tubes;
a first region defining a space with the refrigerant tubes;
a second region defining a space with the refrigerant tubes and having a cross-sectional area in a direction perpendicular to a longitudinal direction of the refrigerant tubes, the cross-sectional area being larger than that of the first region, and
the temperature detector is disposed lower than the second region; wherein
the first region is positioned within a freezing allowable region, and
the second region is positioned within a freezing unallowable region in which freezing of condensed water is prevented by an ON-OFF control of a compressor based on the temperature detected by the temperature detector.

9. The evaporator according to claim 8, wherein a fin is disposed in the air passages, and the temperature detector is attached to an air flow downstream side of the fin.

10. The evaporator according to claim 8, wherein the temperature detector is attached to the cold storage container.

11. The evaporator according to claim 8, wherein the temperature detector is attached to at least one of the refrigerant tubes.

* * * * *